United States Patent
Augier et al.

(10) Patent No.: US 12,544,733 B2
(45) Date of Patent: Feb. 10, 2026

(54) GAS/LIQUID OLIGOMERIZATION REACTOR HAVING SUCCESSIVE ZONES WITH VARIABLE DIAMETERS

(71) Applicant: IFP Energies Nouvelles, Rueil-Malmaison (FR)

(72) Inventors: Frederic Augier, Rueil-Malmaison (FR); Alexandre Vonner, Rueil-Malmaison (FR); Pedro Maximiano Raimundo, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 903 days.

(21) Appl. No.: 17/783,736

(22) PCT Filed: Dec. 8, 2020

(86) PCT No.: PCT/EP2020/085019
§ 371 (c)(1),
(2) Date: Jun. 9, 2022

(87) PCT Pub. No.: WO2021/122140
PCT Pub. Date: Jun. 24, 2021

(65) Prior Publication Data
US 2023/0011845 A1    Jan. 12, 2023

(30) Foreign Application Priority Data
Dec. 18, 2019   (FR) ...................... 1914756

(51) Int. Cl.
*B01J 19/24*       (2006.01)
*B01J 12/00*       (2006.01)
(Continued)

(52) U.S. Cl.
CPC .......... *B01J 19/2435* (2013.01); *B01J 12/00* (2013.01); *B01J 19/0013* (2013.01);
(Continued)

(58) Field of Classification Search
CPC . B01J 10/00; B01J 10/002; B01J 12/00; B01J 19/00; B01J 19/0006; B01J 19/0013;
(Continued)

(56) References Cited

U.S. PATENT DOCUMENTS 4,532,370 A    7/1985    Le Quan et al.
4,615,998 A    10/1986   Le Quan et al.
(Continued)

FOREIGN PATENT DOCUMENTS

CN    1258562 C    6/2006
DE    4338414 C1    3/1995
(Continued)

OTHER PUBLICATIONS

International Search Report PCT/EP2020/085019 dated Feb. 24, 2021 (pp. 1-2).

*Primary Examiner* — Natasha E Young
(74) *Attorney, Agent, or Firm* — Millen, White, Zelano & Branigan, P.C; Brion P. Heaney

(57) ABSTRACT

The present invention relates to a gas/liquid oligomerization reactor with successive zones of variable diameter. The invention also relates to a process for the oligomerization of ethylene using a gas/liquid oligomerization reactor with successive zones of variable diameter.

20 Claims, 5 Drawing Sheets

(51) Int. Cl.
*B01J 19/00* (2006.01)
*C07C 2/08* (2006.01)

(52) U.S. Cl.
CPC ....... *B01J 19/0053* (2013.01); *B01J 19/2465* (2013.01); *C07C 2/08* (2013.01); *B01J 2219/00103* (2013.01); *B01J 2219/00182* (2013.01)

(58) Field of Classification Search
CPC .... B01J 19/0053; B01J 19/24; B01J 19/2415; B01J 19/242; B01J 19/2435; B01J 19/2455; B01J 19/2465; B01J 2219/00; B01J 2219/00049; B01J 2219/00051; B01J 2219/00074; B01J 2219/00087; B01J 2219/00103; B01J 2219/00105; B01J 2219/0011; B01J 2219/00162; B01J 2219/00182; B01J 2219/18; B01J 2219/185; C07C 2/00–10; C07C 2/26; C07C 2/32; C07C 11/00; C07C 11/02; C07C 11/107; C08F 2/00; C08F 2/04; C08F 2/06; C08F 2/00; C08F 4/06; C08F 4/22; C08F 210/00; C08F 210/14; C08F 210/16; C08F 2500/00; C08F 2500/02
See application file for complete search history.

(56) References Cited

U.S. PATENT DOCUMENTS

| | | | |
|---|---|---|---|
| 9,522,856 B2 * | 12/2016 | Venter | ........................ C07C 2/36 |
| 9,539,556 B2 | 1/2017 | Al-Haj Ali et al. | |
| 9,931,622 B2 | 4/2018 | Magna et al. | |
| 10,150,108 B2 | 12/2018 | Magna et al. | |
| 10,646,860 B2 | 5/2020 | Breuil et al. | |
| 11,207,657 B2 | 12/2021 | Augier et al. | |
| 2013/0158321 A1 | 6/2013 | Olivier-Bourbigou et al. | |
| 2018/0318819 A1 | 11/2018 | Breuil et al. | |

FOREIGN PATENT DOCUMENTS

| | | | | |
|---|---|---|---|---|
| EP | 1748038 A1 * | 1/2007 | ............... | C07C 2/30 |
| EP | 2913346 A1 | 9/2015 | | |
| WO | 2019011806 A1 | 1/2019 | | |

* cited by examiner

GAS/LIQUID OLIGOMERIZATION REACTOR HAVING SUCCESSIVE ZONES WITH VARIABLE DIAMETERS

TECHNICAL FIELD

The present invention relates to a gas/liquid reactor for oligomerization comprising a reaction chamber having zones of decreasing diameter from the bottom to the top of the reactor. The invention also relates to the use of said gas/liquid reactor in a process of oligomerization by homogeneous catalysis of ethylene to linear olefins, and in particular to 1-butene, to 1-hexene and/or to 1-octene.

PRIOR ART

The invention relates to the field of gas/liquid reactors, also known as a bubble column, and also to the use thereof in an ethylene oligomerization process. One drawback encountered during the use of such reactors in ethylene oligomerization processes is the management of the gaseous headspace, corresponding to the upper part of the reactor in the gaseous state. Said gaseous headspace comprises gaseous components of low solubility in the liquid phase, compounds which are partially soluble in the liquid but are inert, and gaseous ethylene not dissolved in said liquid. The passage of gaseous ethylene from the liquid lower part of the reaction chamber to the gaseous headspace is a phenomenon referred to as breakthrough. The gaseous headspace is purged in order to remove said gaseous compounds. When the amount of gaseous ethylene present in the gaseous headspace is substantial, the purging of the gaseous headspace leads to a significant loss of ethylene, which is detrimental to the productivity and to the cost of the oligomerization process. Furthermore, a significant phenomenon of breakthrough means that a lot of gaseous ethylene was not dissolved in the liquid phase and therefore was not able to react, which is detrimental to the productivity and the selectivity of the oligomerization process.

To improve the efficiency of the oligomerization process in terms of productivity and cost, it is therefore essential to limit the phenomenon of ethylene breakthrough in order to improve its conversion in said process, while retaining good selectivity for desired linear alpha-olefins.

The prior art processes using a gas/liquid reactor, as illustrated in FIG. 1, do not make it possible to limit the loss of gaseous ethylene, and the purging of the gaseous headspace results in an exit of gaseous ethylene from the reactor that is adverse for the yield and the cost of the process.

In patent applications WO2019/011806 and WO2019/011609, the applicant has described processes enabling an increase in the contact surface area between the upper part of the liquid fraction and the gaseous headspace, by way of a dispersion means or vortex, so as to promote the passage of the ethylene contained in the gaseous headspace toward the liquid phase at the liquid/gas interface. These processes do not make it possible to limit the phenomenon of breakthrough and are insufficient when the amount of ethylene in the gaseous headspace is substantial because of a high level of breakthrough.

In the course of the research, moreover, the applicant has found that in a reactor operating with a constant injection rate of gaseous ethylene, the amount of dissolved ethylene and therefore the level of breakthrough are dependent on the dimensions of the reactors implementing the process, and notably on the height of the liquid phase. Indeed, the lower the height, the shorter the time during which the gaseous ethylene reaches the liquid phase for dissolution, and the higher the level of breakthrough.

The applicant has discovered that it is possible to improve the conversion of olefin(s), while retaining a high selectivity for desired linear olefin(s), and in particular α-olefin(s), by limiting the phenomena of breakthrough by means of a gas/liquid reactor having successive zones of decreasing diameter from the bottom to the top of the reactor.

Advantageously, a reactor according to the present invention makes it possible to increase the height of the reactor and therefore the height of the liquid phase, without modifying the volume of the reactor or of the liquid phase used in an oligomerization reaction, which has the effect of improving the dissolution of the gaseous ethylene and therefore of limiting the phenomenon of breakthrough for a given volume of liquid phase.

The invention thus makes it possible, for a given volume of liquid phase, to increase the height of the liquid phase compared to a constant-diameter reactor.

The invention also relates to a process for the oligomerization of olefins and in particular of ethylene, using the reactor with successive zones of decreasing diameter according to the invention.

BRIEF DESCRIPTION OF THE INVENTION

The present invention thus relates to a gas/liquid reactor with consecutive zones of decreasing diameters, comprising:
- a reaction chamber 1, of elongate shape along the vertical axis,
- a means for introducing gaseous ethylene 2, located in the bottom of the reaction chamber,
- a means for withdrawing 5 a reaction liquid effluent, located in the bottom of the reaction chamber,
- a means for purging 4 a gaseous fraction, located at the top of said reactor; in which
- said chamber is composed of n consecutive zones having a diameter Dn which decreases in the direction of the bottom zone to the top zone of said chamber,
- the ratio (Dn/Dn−1) of the diameter of the upper zone, denoted Dn, to the diameter of the adjacent lower zone, denoted Dn−1, is less than or equal to 0.9,
- for a given zone, the ratio of the volume denoted Vn, to the total volume of the reaction chamber, denoted Vtot, is between 0.2 and 0.8,
- the n consecutive zones are placed in series along the vertical axis of the reactor so as to define zones in the reaction chamber having diameters that decrease from the bottom to the top and thus to increase the height of a liquid phase that can be contained in said reaction chamber compared to the height of a constant-diameter reactor.

In one preferred embodiment, the number n of zones is between 2 and 5.

In one preferred embodiment, the ratio (Dn/Dn−1) of the diameter of an upper zone n to the diameter of the adjacent lower zone n−1 is between 0.1 and 0.9.

In one preferred embodiment, the ratio (Hn/Hn−1) of the height of an upper zone n, denoted Hn, to the height of the adjacent lower zone n−1, denoted Hn−1, is between 0.2 and 3.0, preferably between 0.3 and 2.5.

In one preferred embodiment, for a given zone, the ratio of the volume, denoted Vn, to the total volume, denoted Vtot (said ratio being denoted Vn/Vtot), of the reaction chamber corresponding to the sum of the n zones is between 0.2 and 0.8, preferably between 0.25 and 0.75.

In one preferred embodiment, the n zones making up said chamber are formed by the assembly of cylinders of decreasing diameter.

In one preferred embodiment, the n zones making up said chamber are formed by internals positioned inside the reaction chamber so as to reduce its diameter over a given zone.

In one preferred embodiment, the reactor also comprises a recirculation loop comprising a withdrawal means on the lower part of the reaction chamber, preferably at the bottom, so as to withdraw a liquid fraction to one or more heat exchanger(s) capable of cooling said liquid fraction, and a means for introducing said cooled fraction into the upper part of the reaction chamber.

In one preferred embodiment, the reactor also comprises a means for withdrawing a gaseous fraction at the level of the gaseous headspace of the reaction chamber and a means for introducing said withdrawn gaseous fraction into the liquid phase in the lower part of the reaction chamber.

Another subject of the present invention relates to a process for the oligomerization of gaseous ethylene using the reactor according to any one of the preceding embodiments.

In one preferred embodiment, the process is carried out at a pressure of between 0.1 and 10.0 MPa, at a temperature of between 30 and 200° C., comprising the following steps:
- a step a) of introducing a catalytic oligomerization system comprising a metal catalyst and an activating agent into a reaction chamber,
- a step b) of bringing said catalytic system into contact with gaseous ethylene by introducing said gaseous ethylene into the lower zone of the reaction chamber,
- a step c) of withdrawing a liquid fraction,
- a step d) of cooling the fraction withdrawn in step c) by passing said fraction through a heat exchanger,
- a step e) of introducing the fraction cooled in step d) into the upper part of the lower zone of the reaction chamber.

In one preferred embodiment, the process also comprises a step of recycling a gaseous fraction, withdrawn from the upper zone of the reaction chamber and introduced at the level of the lower part of the reaction chamber, into the liquid phase.

Definitions & Abbreviations

Throughout the description, the terms or abbreviations below have the following meanings:

The term "oligomerization" denotes any addition reaction of a first olefin with a second olefin identical to or different from the first olefin and comprises dimerization, trimerization and tetramerization. The olefin thus obtained is of $C_nH_{2n}$ type, where n is greater than or equal to 4.

The term "olefin" denotes both an olefin and a mixture of olefins.

The term "α-olefin" denotes an olefin in which the double bond is located at the terminal position of the alkyl chain.

The term "heteroatom" is an atom other than carbon and hydrogen. A heteroatom can be chosen from oxygen, sulfur, nitrogen, phosphorus, silicon and halides, such as fluorine, chlorine, bromine or iodine.

The term "hydrocarbon" is an organic compound consisting exclusively of carbon (C) and hydrogen (H) atoms of empirical formula $C_mH_p$, with m and p natural integers.

The term "catalytic system" denotes a mixture of at least one metal precursor, of at least one activating agent, optionally of at least one additive and optionally of at least one solvent.

The term "alkyl" is a saturated or unsaturated, linear or branched, non-cyclic, cyclic or polycyclic hydrocarbon-based chain comprising between 1 and 20 carbon atoms, preferably from 2 to 15 carbon atoms and more preferably still from 2 to 8 carbon atoms, denoted $C_1$-$C_{20}$ alkyl. For example, $C_1$-$C_6$ alkyl is understood to mean an alkyl chosen from the methyl, ethyl, propyl, butyl, pentyl, cyclopentyl, hexyl and cyclohexyl groups.

The term "aryl" is a fused or non-fused, mono- or polycyclic, aromatic group comprising between 6 and 30 carbon atoms, denoted $C_6$-$C_{30}$ aryl.

The term "alkoxy" is a monovalent radical consisting of an alkyl group bonded to an oxygen atom, such as the $C_4H_9O$— group.

The term "aryloxy" is a monovalent radical consisting of an aryl group bonded to an oxygen atom, such as the $C_6H_5O$— group.

Liquid phase is understood to mean the mixture of all of the compounds which are in a liquid physical state under the temperature and pressure conditions of the reaction chamber, it being possible for said phase to comprise gaseous compounds such as gaseous ethylene.

Lower part is understood to mean the part of the chamber located at the level of the liquid phase, and it being possible for said phase to comprise gaseous ethylene, the products of the reaction such as the desired linear alpha-olefin (i.e. 1-butene, 1-hexene, 1-octene), one or more solvents and a catalytic system.

Gaseous headspace is understood to mean the upper part of the chamber in the gaseous state, located at the top of the reaction chamber, that is to say directly above the liquid phase and consisting of a mixture of compounds that are in the physical state of a gas during the use of a reactor in an oligomerization process.

Lateral lower part of the reaction chamber is understood to mean a part of the shell of the reaction chamber of the reactor located in the bottom part and on the side.

Incondensable gas is understood to mean an entity in gaseous physical form which only partially dissolves in the liquid at the temperature and pressure conditions of the reaction chamber and which can, under certain conditions, accumulate in the headspace of the reactor (example here: ethane).

Understood by t/h is the value of a rate expressed in tonnes per hour, and by kg/s the value of a flow rate in kilograms per second.

The terms reactor or device denote all of the means which enable the implementation of the oligomerization process according to the invention, such as in particular the reaction chamber and the recirculation loop.

Bottom of the reaction chamber is understood to mean the lower quarter of the reaction chamber.

Top of the reaction chamber is understood to mean the upper quarter of the reaction chamber.

Bottom zone is understood to mean the first zone according to the invention located in the lower part of the reaction chamber at the level of the bottom of said chamber.

Top zone is understood to mean the final zone according to the invention located in the upper part of the reaction chamber at the level of the top of said chamber.

Fresh gaseous ethylene is understood to mean the ethylene external to the process that is introduced in step b) via the means of the process according to the invention.

Phenomenon of breakthrough is understood to mean the passage of the gaseous ethylene not dissolved in the liquid phase to the gaseous headspace.

Degree of saturation is understood to mean the percentage of ethylene dissolved in the liquid phase relative to the maximum amount of ethylene that could be dissolved in said liquid phase, defined by the thermodynamic equilibrium between the partial pressure of gaseous ethylene and said liquid phase. The degree of saturation can be measured by gas chromatography.

DESCRIPTION OF THE FIGURES

FIGS. 2, 3, 4, and 5 provide schematic illustrations of the particular embodiments of the subject matter of the present invention, without limiting the scope of said invention.

DETAILED DESCRIPTION OF THE INVENTION

Figure 1:
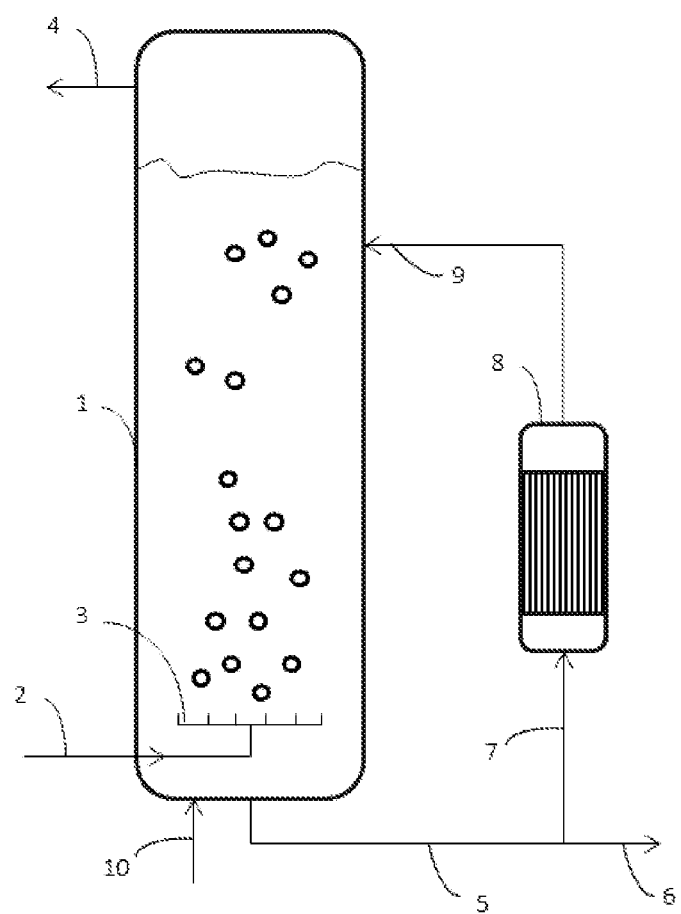
FIG. 1 illustrates a gas/liquid reactor according to the prior art. This device consists of a reaction chamber 1 comprising a lower part comprising a liquid phase, an upper part comprising a gaseous headspace, and a means for introducing gaseous ethylene 2 into the liquid phase by means of a gas distributor 3. The upper part comprises a purging means 4. In the bottom of the reaction chamber 1 there is a pipe for withdrawing a liquid fraction 5. Said fraction 5 is divided into two streams, a first, principal stream 7 which is sent to a heat exchanger 8 and then introduced by means of a pipe 9 into the liquid phase, and a second stream 6 which corresponds to the effluent sent to a subsequent step. The pipe 10 in the bottom of the reaction chamber enables the introduction of the catalytic system.

It is specified that, throughout this description, the expression "between . . . and . . . " should be understood as including the limits mentioned.

For the purposes of the present invention, the different embodiments presented can be used alone or in combination with one another, without any limit to the combinations when this is technically feasible.

For the purposes of the present invention, the various ranges of parameters for a given step, such as the pressure ranges and the temperature ranges, may be used alone or in combination. For example, for the purposes of the present invention, a preferred range of pressure values can be combined with a more preferred range of temperature values.

The present invention thus relates to a gas/liquid oligomerization reactor with consecutive zones of decreasing diameter, comprising:
  a reaction chamber 1, of elongate shape along the vertical axis,
  a means for introducing gaseous ethylene 2, located in the bottom of the reaction chamber,
  a means for withdrawing 5 a reaction liquid effluent, located in the bottom of the reaction chamber,
  a means for purging 4 a gaseous fraction, located at the top of said reactor;
in which
  said chamber is composed of n consecutive zones having a diameter Dn which decreases in the direction of the bottom zone to the top zone of said chamber,
  the ratio (Dn/Dn−1) of the diameter of the upper zone, denoted Dn, to the diameter of the adjacent lower zone, denoted Dn−1, is less than or equal to 0.9,
  for a given zone, the ratio of the volume denoted Vn, to the total volume of the reaction chamber, denoted Vtot, is between 0.2 and 0.8.

Advantageously, a reactor according to the present invention makes it possible to increase the height of the reactor and therefore of the liquid phase, without modifying the volume of liquid used in an oligomerization reaction, which has the effect of improving the dissolution of the gaseous ethylene and therefore of limiting the phenomenon of breakthrough for a given volume of liquid phase.

A Reaction Chamber

The reaction chamber 1 according to the invention thus comprises
  n consecutive zones having a diameter Dn which decreases in the direction of the bottom zone to the top zone of said chamber,
  the ratio (Dn/Dn−1) of the diameter of the upper zone, denoted Dn, to the diameter of the adjacent lower zone, denoted Dn−1, is less than or equal to 0.9,
  for a given zone, the ratio of the volume denoted Vn, to the total volume of the reaction chamber, denoted Vtot, is between 0.2 and 0.8,
  n consecutive zones according to the invention are placed in series along the vertical axis of the reactor so as to define zones in the reaction chamber having diameters that decrease from the bottom to the top and thus to increase the height of the liquid phase that can be contained in the reaction chamber compared to the height of a constant-diameter reactor, and thus the time during which the ethylene is present in the liquid phase so as to improve its dissolution.

Advantageously, for a given reaction chamber volume and thus a given liquid volume, the n consecutive zones of decreasing diameter in said reaction chamber make it possible to increase the height of the liquid that can be contained in said chamber and thus the residence time of the gaseous ethylene introduced into said liquid phase. Thus, the present invention makes it possible to increase the amount of ethylene dissolved in the liquid phase and thus to limit the breakthrough phenomenon.

Preferably, the reaction chamber comprises a number n of zones of between 2 and 5 and preferably of between 2 and 4, and n is preferably equal to 2, 3, 4 or 5.

The ratio (Dn/Dn−1) of the diameter of an upper zone n, denoted Dn, to the diameter of the adjacent lower zone n−1, denoted Dn−1, is less than or equal to 0.9. Preferably, the ratio Dn/Dn−1 is between 0.1 and 0.9, preferably between 0.15 and 0.85, preferably between 0.2 and 0.8 and preferably between 0.25 and 0.75 and very preferably between 0.3 and 0.7.

The n zones making up the reaction chamber have a total height, denoted Htot, the sum of which is equal to the total height of the reaction chamber.

Advantageously, the ratio (Hn/Hn−1) of the height of an upper zone n, denoted Hn, to the height of the adjacent lower zone n−1, denoted Hn−1, is between 0.2 and 3.0, preferably between 0.3 and 2.5, preferably between 0.4 and 2.0, preferably between 0.5 and 1.5 and preferably between 0.6 and 1.0.

Preferably, for a given zone, the ratio of the volume, denoted Vn, to the total volume, denoted Vtot (said ratio being denoted Vn/Vtot), of the reaction chamber corresponding to the sum of the n zones is between 0.2 and 0.8. Preferably, said ratio (Vn/Vtot) is between 0.25 and 0.75, preferably between 0.3 and 0.7 and preferably between 0.35 and 0.65.

Preferably, the reaction chamber is cylindrical in shape and has a ratio of the total height of the chamber to the diameter of the bottom zone of said chamber (denoted Htot/D1) of between 1 and 17, preferably between 1 and 8 and preferably between 2 and 7.

Figure 2:
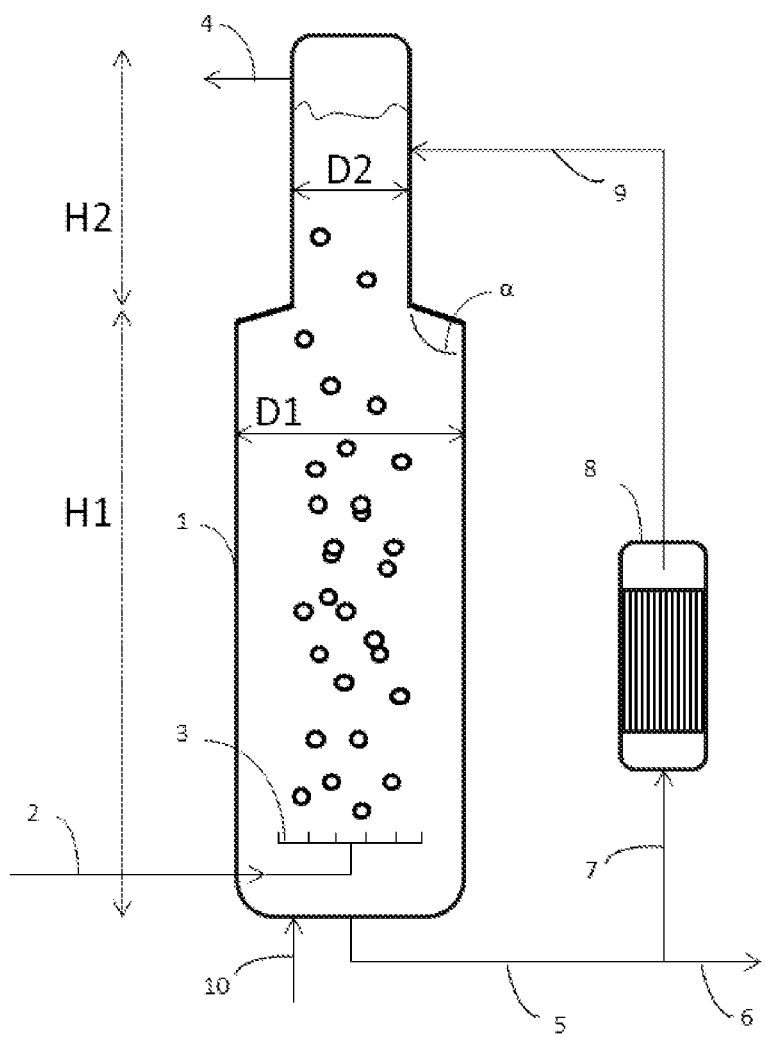
FIG. 2 illustrates a gas/liquid reactor with consecutive zones of decreasing diameter according to the invention. Said reactor differs from the reactor of FIG. 1 in that it comprises two zones of different diameter. Zone 1 located at the bottom of the reaction chamber has a diameter greater than the zone located at the top of said chamber. The first bottom zone is characterized by its diameter denoted D1 and its height H1, these two parameters defining the volume, denoted V1, of said zone. Similarly, the second zone located at the top is characterized by its height denoted H2 and its diameter denoted D2, which is less than D1, defining the volume, V2, of the second zone. In this embodiment, the two zones making up the reaction chamber 1 are formed by cylinders of decreasing diameter.

In a first particular embodiment represented in FIG. 2, the n zones making up said chamber are formed by cylinders of decreasing diameter. Said cylinders are connected to one another by means of walls perpendicular to the vertical axis or having an angle α of between 90 and 160° with the vertical axis, represented in FIG. 2, so as to facilitate and especially not to block the rise of the gaseous ethylene bubbles in the liquid phase. Preferably, said angle is between 95 and 145° and preferably between 100 and 130°.

Figure 3:
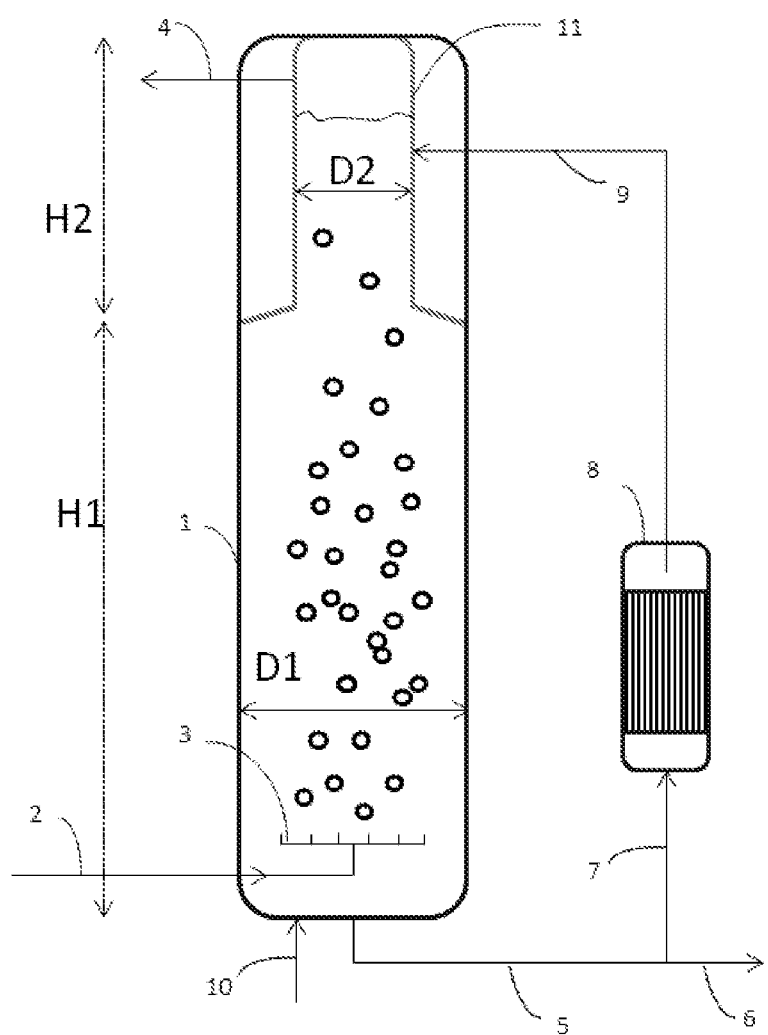
FIG. 3 illustrates another embodiment, which differs from that of FIG. 2 in that the second zone located at the top of the reaction chamber 1 is delimited by an internal 11 placed inside the reaction chamber 1.
Figure 4:
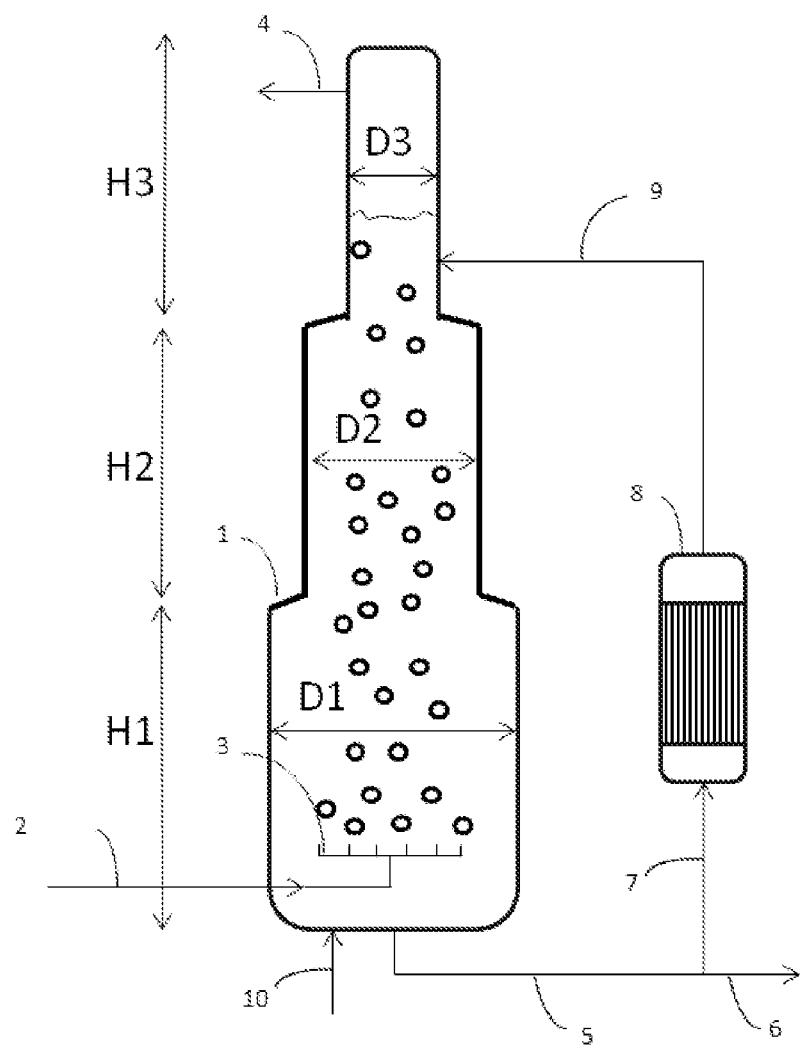
FIG. 4 illustrates another embodiment, which differs from that of FIG. 2 in that the reaction chamber 1 comprises three consecutive zones of decreasing diameter.

In a second particular embodiment represented in FIG. 3, the n zones making up said chamber are formed by internals positioned inside the reaction chamber so as to reduce its diameter over a given zone. Said internals may for example be solid metal walls.

Advantageously, regardless of the embodiment, the securing of the reaction chamber is carried out by attaching the cylinders and/or the internals, for example by welding, by adhesive bonding, by screwing or by bolting, alone or in combination, or any other similar means. Preferably, the attaching is performed by welding.

Preferably, the reaction chamber also comprises a means for purging the uncondensable gases in the gaseous headspace.

Preferably, the reaction chamber also comprises a pressure sensor, allowing the pressure within the reaction chamber to be controlled and, preferably, to be kept constant. Preferably, in the event of a decrease in the pressure, said pressure is kept constant by the introduction of gaseous ethylene into the reaction chamber.

A Means for Introducing the Gaseous Ethylene

According to the invention, the reaction chamber comprises a means for introducing the gaseous ethylene located in the bottom of said chamber, more particularly in the lateral lower part.

Preferably, the means for introducing the ethylene is chosen from a pipe, a network of pipes, a multi-tubular distributor, a perforated plate or any other means known to those skilled in the art.

In one particular embodiment, the means for introducing the ethylene is located in the recirculation loop.

Preferably, a gas distributor, which is a device that makes it possible to disperse the gas phase uniformly over the entire liquid cross section, is positioned at the end of the introduction means within the reaction chamber. Said device comprises a network of perforated pipes, the diameter of the orifices of which is between 1.0 and 12.0 mm, preferably between 3.0 and 10.0 mm, in order to form ethylene bubbles of millimetric size in the liquid.

An Optional Means for Introducing the Catalytic System

According to the invention, the reaction chamber comprises a means for introducing the catalytic system.

Preferably, the introduction means is located in the bottom of said chamber.

According to an alternative embodiment, the catalytic system is introduced into the recirculation loop.

The means for introducing the catalytic system is chosen from any means known to those skilled in the art and is preferably a pipe.

In the embodiment where the catalytic system is used in the presence of a solvent or of a mixture of solvents, said solvent or said mixture of solvents is introduced by an introduction means located in the bottom of the reaction chamber, or else in the recirculation loop.

An Optional Recirculation Loop

Advantageously, the liquid phase can be rendered homogeneous and also the temperature within the reaction chamber of the reactor according to the invention can be regulated by the use of a recirculation loop comprising a withdrawal means on the lower part of the reaction chamber, preferably at the bottom, for withdrawing a liquid fraction to one or more heat exchanger(s), enabling the cooling of said liquid fraction, and a means for introducing said cooled liquid fraction into the upper part of the reaction chamber, preferably at the level of the liquid phase.

The recirculation loop enables effective homogenization of the concentrations and makes it possible to control the temperature in the liquid phase within the reaction chamber.

Advantageously, the use of a recirculation loop makes it possible to induce a direction of circulation of the liquid phase in the reaction chamber from the upper part to the lower part of said chamber, which makes it possible to increase the residence time of the gaseous ethylene by slowing its rise in said liquid phase and therefore to further limit the breakthrough phenomenon.

The recirculation loop can advantageously be implemented by any necessary means known to those skilled in the art, such as a pump for the withdrawal of the liquid fraction, a means capable of regulating the flow rate of the liquid fraction withdrawn, or else a pipe for purging at least part of the liquid fraction.

Preferably, the means for withdrawing and the means for introducing the liquid fraction of the reaction chamber are a pipe.

The heat exchanger(s) capable of cooling the liquid fraction is (are) chosen from any means known to those skilled in the art.

An Optional Loop for Recycling of the Gaseous Headspace

Advantageously, the gas/liquid oligomerization reactor with consecutive zones of variable diameter also comprises a loop for recycling of the gaseous headspace in the lower part of the reaction chamber at the level of the liquid phase. Said loop comprises a means for withdrawing a gaseous fraction at the level of the gaseous headspace of the reaction chamber and a means for introducing said withdrawn gaseous fraction into the liquid phase in the lower part of the reaction chamber.

The recycle loop makes it possible, advantageously, to compensate for the phenomenon of breakthrough and to prevent the pressure in the reaction chamber from increasing, while keeping the saturation of ethylene dissolved in the liquid phase at a desired level.

Another advantage of the recycle loop is to improve the volume productivity of the device and therefore to reduce the costs. In one preferred embodiment, the recycle loop also comprises a compressor.

Figure 5:
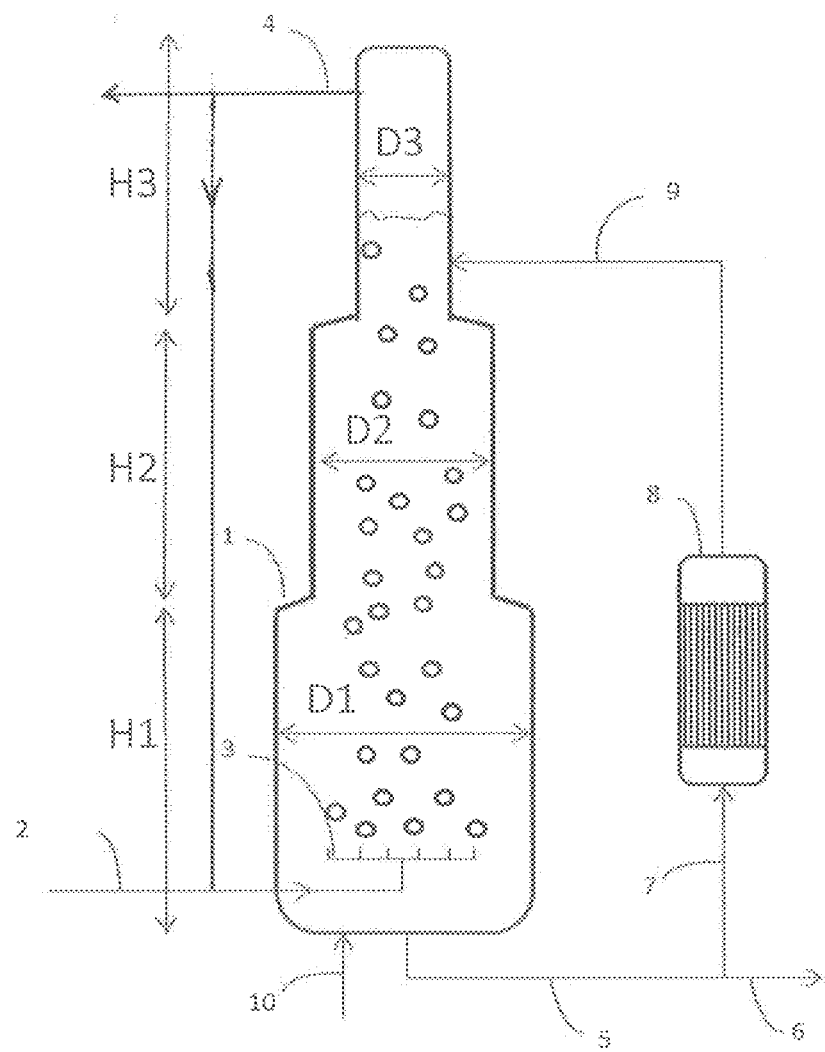
FIG. 5 illustrates another embodiment, which differs from that of FIG. 4 in that a portion of gaseous fraction 4 withdrawn headspace of the reaction chamber is introduced into the liquid phase in the lower part of the reaction chamber with the gaseous ethylene 2.

In one embodiment, the withdrawn gaseous fraction is introduced by way of the means for introducing the gaseous ethylene. An example of this embodiment is shown in FIG. 5.

In another embodiment, the withdrawn gaseous fraction is introduced by means of a gas distributor which is a device that makes it possible to disperse the gas phase uniformly over the entire liquid cross section and is positioned at the end of the introduction means within the reaction chamber. Said device comprises a network of perforated pipes, the diameter of the orifices of which is between 1.0 and 12.0 mm, preferably between 3.0 and 10.0 mm, in order to form ethylene bubbles of millimetric size in the liquid.

Preferably, the means for introducing the withdrawn gaseous fraction is chosen from a pipe, a network of pipes, a multi-tubular distributor, a perforated plate or any other means known to those skilled in the art.

Oligomerization Process

Another subject of the present invention covers an oligomerization process using the reactor with zones of a variable diameter according to the invention as described above.

Preferably, in a gas/liquid reactor, the flow rate of gaseous ethylene introduced in step b) as defined below is dependent on the pressure in the reaction chamber. Thus, in the event of an increase in the pressure in the reactor, owing to a high level of breakthrough by the ethylene into the gaseous headspace, the flow rate of gaseous ethylene introduced in step b), as defined above, decreases, leading to a decrease in the amount of ethylene dissolved in the liquid phase, and hence in the ethylene saturation. This decrease is detrimental to the conversion of the ethylene and is accompanied by a decrease in the productivity of the reactor, and possibly in its selectivity.

Advantageously, the use of the reactor with zones of variable diameter according to the invention in an oligomerization process, preferably using a homogeneous catalyst, makes it possible to have a degree of saturation of ethylene dissolved in the liquid phase of greater than 70.0%, preferably between 70.0 and 100%, preferably between 80.0 and 100%, preferably between 80.0 and 99.0%, preferably between 85.0% and 99.0% and even more preferably between 90.0 and 98.0%.

The degree of saturation of dissolved ethylene may be measured by any method known to those skilled in the art and, for example, by gas chromatography (commonly referred to as GC) analysis of a fraction of the liquid phase withdrawn from the reaction chamber.

The process using the reactor with zones of variable diameter according to the invention makes it possible to obtain linear olefins and in particular linear alpha-olefins by bringing olefin(s) and a catalytic system into contact, optionally in the presence of an additive and/or of a solvent, and by the use of said gas/liquid reactor with zones of variable diameter.

Any catalytic system known to those skilled in the art and capable of being employed in the dimerization, trimerization or tetramerization processes and more generally in the oligomerization processes according to the invention comes within the field of the invention. Said catalytic systems and also the implementations thereof are described in particular in applications FR 2 984 311, FR 2 552 079, FR 3 019 064, FR 3 023 183, FR 3 042 989 or else in application FR 3 045 414.

Preferably, the catalytic systems comprise, preferably consist of:
- a metal precursor, preferably based on nickel, on titanium or on chromium,
- an activating agent,
- optionally an additive, and
- optionally a solvent.

The Metal Precursor

The metal precursor used in the catalytic system is chosen from compounds based on nickel, on titanium or on chromium.

In one embodiment, the metal precursor is based on nickel and preferably comprises nickel with a (+II) oxidation state. Preferably, the nickel precursor is chosen from nickel(II) carboxylates, such as, for example, nickel 2-ethylhexanoate, nickel(II) phenates, nickel(II) naphthenates, nickel(II) acetate, nickel(II) trifluoroacetate, nickel(II) triflate, nickel (II) acetylacetonate, nickel(II) hexafluoroacetylacetonate, π-allylnickel(II) chloride, π-allylnickel(II) bromide, methallylnickel(II) chloride dimer, $\eta^3$-allylnickel(II) hexafluorophosphate, $\eta^3$-methallylnickel(II) hexafluorophosphate and nickel(II) 1,5-cyclooctadienyl, in their hydrated or nonhydrated form, taken alone or as a mixture.

In a second embodiment, the metal precursor is based on titanium and preferably comprises a titanium aryloxy or alkoxy compound.

The titanium alkoxy compound advantageously corresponds to the general formula [Ti(OR)$_4$] in which R is a linear or branched alkyl radical. Mention may be made, among the preferred alkoxy radicals, as nonlimiting examples, of tetraethoxy, tetraisopropoxy, tetra(n-butoxy) and tetra(2-ethylhexyloxy).

The titanium aryloxy compound advantageously corresponds to the general formula [Ti(OR')$_4$] in which R' is an aryl radical substituted or unsubstituted by alkyl or aryl groups. The R' radical can comprise heteroatom-based substituents. The preferred aryloxy radicals are chosen from phenoxy, 2-methylphenoxy, 2,6-dimethylphenoxy, 2,4,6-trimethylphenoxy, 4-methylphenoxy, 2-phenylphenoxy, 2,6-diphenylphenoxy, 2,4,6-triphenylphenoxy, 4-phenylphenoxy, 2-(tert-butyl)-6-phenylphenoxy, 2,4-di(tert-butyl)-6-phenylphenoxy, 2,6-diisopropylphenoxy, 2,6-di(tert-butyl) phenoxy, 4-methyl-2,6-di(tert-butyl)phenoxy, 2,6-dichloro-4-(tert-butyl)phenoxy and 2,6-dibromo-4-(tert-butyl) phenoxy, the biphenoxy radical, binaphthoxy or 1,8-naphthalenedioxy.

According to a third embodiment, the metal precursor is based on chromium and preferentially comprises a chromium(II) salt, a chromium(III) salt or a salt of different oxidation state which may comprise one or more identical or different anions, for instance halides, carboxylates, acetylacetonates or alkoxy or aryloxy anions. Preferably, the chromium-based precursor is chosen from CrCl$_3$, CrCl$_3$(tetrahydrofuran)$_3$, Cr(acetylacetonate)$_3$, Cr(naphthenate)$_3$, Cr(2-ethylhexanoate)$_3$ and Cr(acetate)$_3$.

The concentration of nickel, of titanium or of chromium is between 0.01 and 300.0 ppm by mass of atomic metal, relative to the reaction mass, preferably between 0.02 and 100.0 ppm, preferably between 0.03 and 50.0 ppm, more preferably between 0.5 and 20.0 ppm and even more preferably between 2.0 and 50.0 ppm by mass of atomic metal, relative to the reaction mass.

The Activating Agent

Whatever the metal precursor, the catalytic system additionally comprises one or more activating agents chosen from aluminium-based compounds, such as methylaluminium dichloride (MeAlCl$_2$), dichloroethylaluminium (EtAlCl$_2$), ethylaluminium sesquichloride (Et$_3$Al$_2$Cl$_3$), chlorodiethylaluminium (Et$_2$AlCl), chlorodiisobutylaluminium (i-Bu$_2$AlCl), triethylaluminium (AlEt$_3$), tripropylaluminium (Al(n-Pr)$_3$), triisobutylaluminium (Al(i-Bu)$_3$), diethylethoxyaluminium (Et$_2$AlOEt), methylaluminoxane (MAO), ethylaluminoxane and modified methylaluminoxanes (MMAO).

The Additive

Optionally, the catalytic system comprises one or more additives.

When the catalytic system is based on nickel, the additive is chosen from:

compounds of nitrogenous type, such as trimethylamine, triethylamine, pyrrole, 2,5-dimethylpyrrole, pyridine, 2-methylpyridine, 3-methylpyridine, 4-methylpyridine, 2-methoxypyridine, 3-methoxypyridine, 4-methoxypyridine, 2-fluoropyridine, 3-fluoropyridine, 3-trifluoromethylpyridine, 2-phenylpyridine, 3-phenylpyridine, 2-benzylpyridine, 3,5-dimethylpyridine, 2,6-di(tert-butyl)pyridine and 2,6-diphenylpyridine, quinoline, 1,10-phenanthroline, N-methylpyrrole, N-butylpyrrole, N-methylimidazole, N-butylimidazole, 2,2'-bipyridine, N,N'-dimethylethane-1,2-diimine, N,N'-di(t-butyl)ethane-1,2-diimine, N,N'-di(t-butyl)butane-2,3-diimine, N,N'-diphenylethane-1,2-diimine, N,N'-bis(2,6-dimethylphenyl)ethane-1,2-diimine, N,N'-bis(2,6-diisopropylphenyl)ethane-1,2-diimine, N,N'-diphenylbutane-2,3-diimine, N,N'-bis(2,6-dimethylphenyl)butane-2,3-diimine or N,N'-bis(2,6-diisopropylphenyl)butane-2,3-diimine, or compounds of phosphine type independently chosen from tributylphosphine, triisopropylphosphine, tricyclopentylphosphine, tricyclohexylphosphine, triphenylphosphine, tris(o-tolyl)phosphine, bis(diphenylphosphino)ethane, trioctylphosphine oxide, triphenylphosphine oxide or triphenyl phosphite, or the compounds corresponding to general formula (I) or a tautomer of said compound:

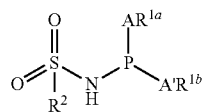

(I)

in which:

A and A', which may be identical or different, are independently an oxygen or a single bond between the phosphorus atom and a carbon atom, the R$^{1a}$ and R$^{1b}$ groups are independently chosen from the methyl, trifluoromethyl, ethyl, n-propyl, isopropyl, n-butyl, isobutyl, t-butyl, pentyl, cyclohexyl or adamantyl groups, which are substituted or unsubstituted and contain or do not contain heteroelements; the phenyl, o-tolyl, m-tolyl, p-tolyl, mesityl, 3,5-dimethylphenyl, 4-(n-butyl)phenyl, 2-methylphenyl, 4-methoxyphenyl, 2-methoxyphenyl, 3-methoxyphenyl, 4-methoxyphenyl, 2-isopropoxyphenyl, 4-methoxy-3,5-dimethylphenyl, 3,5-di(tert-butyl)-4-methoxyphenyl, 4-chlorophenyl, 3,5-di(trifluoromethyl)phenyl, benzyl, naphthyl, bisnaphthyl, pyridyl, bisphenyl, furanyl or thiophenyl groups, the R$^2$ group is independently chosen from the methyl, trifluoromethyl, ethyl, n-propyl, isopropyl, n-butyl, isobutyl, t-butyl, pentyl, cyclohexyl or adamantyl groups, which are substituted or unsubstituted and contain or do not contain heteroelements; the phenyl, o-tolyl, m-tolyl, p-tolyl, mesityl, 3,5-dimethylphenyl, 4-(n-butyl)phenyl, 4-methoxyphenyl, 2-methoxyphenyl, 3-methoxyphenyl, 4-methoxyphenyl, 2-isopropoxyphenyl, 4-methoxy-3,5-dim ethylphenyl, 3,5-di(tert-butyl)-4-methoxyphenyl, 4-chlorophenyl, 3,5-bis(trifluoromethyl)phenyl, benzyl, naphthyl, bisnaphthyl, pyridyl, bisphenyl, furanyl or thiophenyl groups.

When the catalytic system is based on titanium, the additive is chosen from diethyl ether, diisopropyl ether, dibutyl ether, diphenyl ether, 2-methoxy-2-methylpropane, 2-methoxy-2-methylbutane, 2,2-dimethoxypropane, 2,2-di(2-ethylhexyloxy)propane, 2,5-dihydrofuran, tetrahydrofuran, 2-methoxytetrahydrofuran, 2-methyltetrahydrofuran, 3-methyltetrahydrofuran, 2,3-dihydropyran, tetrahydropyran, 1,3-dioxolane, 1,3-dioxane, 1,4-dioxane, dimethoxyethane, di(2-methoxyethyl) ether, benzofuran, glyme and diglyme, taken alone or as a mixture.

When the catalytic system is based on chromium, the additive is chosen from:

compounds of nitrogenous type, such as trimethylamine, triethylamine, pyrrole, 2,5-dimethylpyrrole, pyridine, 2-methylpyridine, 3-methylpyridine, 4-methylpyridine, 2-methoxypyridine, 3-methoxypyridine, 4-methoxypyridine, 2-fluoropyridine, 3-fluoropyridine, 3-trifluoromethylpyridine, 2-phenylpyridine, 3-phenylpyridine, 2-benzylpyridine, 3,5-dimethylpyridine, 2,6-di(tert-butyl)pyridine and 2,6-diphenylpyridine, quinoline, 1,10-phenanthroline, N-methylpyrrole, N-butylpyrrole, N-methylimidazole, N-butylimidazole, 2,2'-bipyridine, N,N'-dimethylethane-1,2-diimine, N,N'-di(t-butyl)ethane-1,2-diimine, N,N'-di(t-butyl)butane-2,3-diimine, N,N'-diphenylethane-1,2-diimine, N,N'-bis(2,6-dimethylphenyl)ethane-1,2-diimine, N,N'-bis(2,6-diisopropylphenyl)ethane-1,2-diimine, N,N'-diphenylbutane-2,3-diimine, N,N'-bis(2,6-dimethylphenyl)butane-2,3-diimine or N,N'-bis(2,6-diisopropylphenyl)butane-2,3-diimine, and/or aryloxy compounds of general formula [M(R$^3$O)$_{2-n}$X$_n$]$_y$, in which:

M is chosen from magnesium, calcium, strontium and barium, preferably magnesium, R$^3$ is an aryl radical containing from 6 to 30 carbon atoms and X is a halogen or an alkyl radical containing from 1 to 20 carbon atoms, n is an integer which can take the values of 0 or 1, and y is an integer between 1 and 10; preferably, y is equal to 1, 2, 3 or 4.

Preferably, the aryloxy radical R$^3$O is chosen from 4-phenylphenoxy, 2-phenylphenoxy, 2,6-diphenylphenoxy, 2,4,6-triphenylphenoxy, 2,3,5,6-tetraphenylphenoxy, 2-(tert-butyl)-6-phenylphenoxy, 2,4-di(tert-butyl)-6-phenylphenoxy, 2,6-diisopropylphenoxy, 2,6-dimethylphenoxy, 2,6-di(tert-butyl)phenoxy, 4-methyl-2,6-di(tert-butyl)phenoxy, 2,6-dichloro-4-(tert-butyl)phenoxy and 2,6-dibromo-4-(tert-butyl)phenoxy. The two aryloxy radicals may be borne by the same molecule, for instance the biphenoxy radical, binaphthoxy or 1,8-naphthalenedioxy. Preferably, the aryloxy radical $R^3O$ is 2,6-diphenylphenoxy, 2-(tert-butyl)-6-phenylphenoxy or 2,4-di(tert-butyl)-6-phenylphenoxy.

The Solvent

In another embodiment according to the invention, the catalytic system optionally comprises one or more solvents.

The solvent is chosen from the group formed by aliphatic and cycloaliphatic hydrocarbons, such as hexane, cyclohexane, heptane, butane or isobutane.

Preferably, the solvent used is cyclohexane.

In one embodiment, a solvent or a mixture of solvents may be used during the oligomerization reaction. Said solvent is advantageously chosen independently from the group formed by aliphatic and cycloaliphatic hydrocarbons, such as hexane, cyclohexane, heptane, butane or isobutane.

Preferably, the linear alpha-olefins obtained comprise from 4 to 20 carbon atoms, preferably from 4 to 18 carbon atoms, preferably from 4 to 10 carbon atoms and preferably from 4 to 8 carbon atoms. Preferably, the olefins are linear alpha-olefins chosen from 1-butene, 1-hexene or 1-octene.

Advantageously, the oligomerization process is performed at a pressure of between 0.1 and 10.0 MPa, preferably between 0.2 and 9.0 MPa and preferentially between 0.3 and 8.0 MPa, at a temperature of between 30 and 200° C., preferably between 35 and 150° C. and preferably between 45 and 140° C.

The concentration of catalyst is preferably between 0.01 and 500.0 ppm by mass of atomic metal relative to the reaction mass, preferably between 0.05 and 100.0 ppm, preferably between 0.1 and 50.0 ppm and preferably between 0.2 and 30.0 ppm by mass of atomic metal relative to the reaction mass.

According to another embodiment, the oligomerization process is implemented continuously. The catalytic system, constituted as described above, is injected at the same time as the ethylene into a reactor stirred by conventional mechanical means known to those skilled in the art or by external recirculation, and maintained at the desired temperature. The components of the catalytic system can also be injected separately into the reaction medium. The gaseous ethylene is introduced by an intake valve in dependence on the pressure, which keeps the latter constant in the reactor. The reaction mixture is withdrawn by means of a liquid-level-control valve, so as to keep said level constant. The catalyst is destroyed continuously by any usual means known to those skilled in the art and then the products resulting from the reaction, and also the solvent, are separated, for example by distillation. The ethylene which has not been converted may be recycled into the reactor. The catalyst residues included in a heavy fraction can be incinerated.

Step a) of Introducing the Catalytic System

The process using the reactor with successive zones of variable diameter according to the invention comprises a step a) of introducing a catalytic system comprising a metal catalyst and an activating agent, and optionally of introducing a solvent or a mixture of solvents, into a reaction chamber comprising a liquid phase in a lower part and a gaseous headspace in an upper part.

Preferably, the catalytic system is introduced into the liquid phase in the lower part of the reaction chamber and preferably in the bottom of the reaction chamber.

Preferably, the pressure for introduction into the reaction chamber is between 0.1 and 10.0 MPa, preferably between 0.2 and 9.0 MPa and preferentially between 0.3 and 8.0 MPa.

Preferably, the temperature for introduction into the reaction chamber is between 30 and 200° C., preferably between 35° C. and 150° C. and preferentially between 45° C. and 140° C.

Step b) of Bringing into Contact with Gaseous Ethylene

The process using the reactor with zones of variable diameter according to the invention comprises a step b) of bringing the catalytic system introduced in step a) into contact with gaseous ethylene. Said gaseous ethylene is introduced into the liquid phase at the lower part of the reaction chamber, preferably on the lateral lower part of the reaction chamber. The gaseous ethylene introduced comprises fresh gaseous ethylene, and preferably said fresh gaseous ethylene is combined with gaseous ethylene recycled in a separation step after the oligomerization process.

In the implementation of the process according to the invention, following the step of introducing the gaseous ethylene, the liquid phase comprises undissolved gaseous ethylene and so, according to the zones of the reaction chamber, the liquid phase corresponds to a gas-liquid mixture between, notably, the liquid phase and the gaseous ethylene. Preferably, the zone in the bottom of the reaction chamber beneath the level at which the gaseous ethylene is introduced comprises and preferably consists of the liquid phase without gaseous ethylene.

Preferably, the gaseous ethylene is distributed by dispersion during the introduction thereof into the liquid phase in the lower part of the reaction chamber by a means able to carry out said dispersion uniformly over the entire cross section of the reactor. Preferably, the dispersion means is chosen from a distributor network with a homogeneous distribution of the ethylene injection points over the entire cross section of the reactor.

Preferably, the velocity of the gaseous ethylene at the outlet of the orifices is between 1.0 and 30.0 m/s. Its superficial velocity (volumetric gas velocity divided by the cross section of the reaction chamber) is between 0.5 and 10.0 cm/s and preferably between 1.0 and 8.0 cm/s.

Preferably, the gaseous ethylene is introduced at a flow rate of between 1 and 250 t/h, preferably between 3 and 200 t/h, preferably between 5 and 150 t/h and preferably between 10 and 100 t/h.

Preferably, the flow rate of gaseous ethylene introduced in step b) is dependent on the pressure in the reaction chamber.

According to a specific embodiment of the invention, a stream of gaseous hydrogen can also be introduced into the reaction chamber, with a flow rate representing from 0.2% to 1.0% by mass of the flow rate of incoming ethylene. Preferably, the stream of gaseous hydrogen is introduced by the pipe employed for the introduction of the gaseous ethylene.

Step c) of Withdrawing a Fraction of the Liquid Phase

The process using the reactor with zones of variable diameter according to the invention comprises a step c) of withdrawing a fraction of the liquid phase preferably in the lower part of the reaction chamber.

The withdrawal implemented in step c) is preferably carried out in the lower part of the reaction chamber, preferably below the level of injection of gaseous ethylene, and preferably in the bottom of the chamber. The withdrawal is carried out by any means capable of carrying out the withdrawal and preferably by a pump.

Preferably, the withdrawal flow rate is between 500 and 10 000 t/h and preferably between 800 and 7000 t/h.

In one embodiment, a second stream is withdrawn from the liquid phase. Said second stream corresponds to the effluent obtained at the end of the oligomerization process, and can be sent to a separating section located downstream of the device employed in the process according to the invention.

According to a preferred embodiment, the liquid fraction withdrawn from the liquid phase is divided into two streams. The first, principal stream is sent to the cooling step d), and the second stream corresponds to the effluent and is sent to the downstream separating section.

Advantageously, the flow rate of said second stream is regulated so as to maintain a constant liquid level in the reactor. Preferably, the flow rate of said second stream is from 5 to 200 times lower than the liquid flow rate sent to the cooling step. Preferably, the flow rate of said effluent is from 5 to 150 times lower, preferably from 10 to 120 times lower and preferentially from 20 to 100 times lower.

Step d) of Cooling the Liquid Fraction

The process using the reactor with zones of variable diameter according to the invention comprises a step d) of cooling the liquid fraction withdrawn in step c).

Preferably, the cooling step is carried out by the circulation of the main liquid stream withdrawn in step c) through one or more heat exchangers located inside or outside the reaction chamber and preferably outside.

The heat exchanger enables a decrease in the temperature of the liquid fraction of 1.0 to 30.0° C., preferably between 2.0 and 20° C., preferably between 2.0 and 15.0° C., preferably between 2.5 and 10.0° C., preferably from 3.0 to 9.0° C., preferably from 4.0 to 8.0° C. Advantageously, the cooling of the liquid fraction makes it possible to keep the temperature of the reaction medium within the desired temperature ranges.

Advantageously, carrying out the step of cooling the liquid via the recirculation loop also makes it possible to carry out the stirring of the reaction medium and thus to homogenize the concentrations of the reactive entities throughout the liquid volume of the reaction chamber.

Step e) of Introducing the Cooled Liquid Fraction

The process using the reactor with zones of variable diameter according to the invention comprises a step e) of introducing the liquid fraction cooled in step d).

The introduction of the cooled liquid fraction resulting from step d) is carried out in the liquid phase of the reaction chamber, preferably in the upper part of said chamber, by any means known to those skilled in the art.

Advantageously, when the cooled fraction is introduced into the upper part of the liquid phase contained in the reaction chamber, a directional circulation of said liquid phase is induced from the top to the bottom of said chamber, which slows the rise of the gaseous ethylene in the liquid phase and therefore improves the dissolution of the ethylene in the liquid phase. Thus, the combination of this embodiment and of the reactor with zones of variable diameter according to the invention makes it possible to even more successfully limit the breakthrough phenomenon.

Preferably, the flow rate for introduction of the cooled liquid fraction is between 500 and 10 000 t/h and preferably between 800 and 7000 t/h.

Steps c) to e) constitute a recirculation loop. Advantageously, the recirculation loop makes it possible to stir the reaction medium and thus to homogenize the concentrations of the reactive entities throughout the liquid volume of the reaction chamber.

Optional Step f) of Recycling a Gaseous Fraction Withdrawn from the Gaseous Headspace The process using the reactor with zones of variable diameter according to the invention comprises a step f) of recycling a gaseous fraction, withdrawn from the gaseous headspace of the reaction chamber and introduced at the lower part of the reaction chamber, into the liquid phase, preferably in the lateral lower part of the reaction chamber, preferably at the bottom of the reaction chamber. The lower part denotes the lower quarter of the reaction chamber.

Step f) of recycling the gaseous fraction is also called a recycle loop. The withdrawal of the gaseous fraction, implemented in step f), is carried out by any means capable of performing the withdrawal, and preferably by a pump.

An advantage of the recycling step f) is that it enables simple and economic compensation of the phenomenon of breakthrough of the gaseous ethylene into the gaseous headspace in an oligomerization process, irrespective of the dimensions of the reactor according to the invention.

The phenomenon of breakthrough corresponds to the gaseous ethylene which crosses the liquid phase without dissolving and which passes into the gaseous headspace. When the flow rate of gaseous ethylene injected and the headspace volume are fixed at a given value, breakthrough then leads to an increase in pressure in the reaction chamber. In a gas/liquid reactor used according to a preferred process, the flow rate of introduction of the ethylene in step b) is dependent on the pressure in the reaction chamber. Accordingly, in the case of an increase in the pressure in the reactor owing to a high level of breakthrough of the ethylene into the gaseous headspace, the flow rate of gaseous ethylene introduced in step b) decreases, so giving rise to a decrease in the amount of ethylene dissolved in the liquid phase and hence in the saturation. The decrease in saturation is detrimental to the conversion of ethylene and is accompanied by decreasing the productivity of the reactor. The step of recycling a gaseous fraction according to the invention therefore allows the saturation of dissolved ethylene to be optimized and hence the volume productivity of the process to be improved.

The gaseous fraction withdrawn in step f) may be introduced into the reaction chamber alone or as a mixture with the gaseous ethylene introduced in step b). Preferably, the gaseous fraction is introduced as a mixture with the gaseous ethylene introduced in step b).

In one particular embodiment, the gaseous fraction withdrawn in step f) is introduced into the reaction chamber by dispersion in the liquid phase in the lower part of the reaction chamber by a means capable of carrying out said dispersion uniformly over the entire cross section of the reactor. Preferably, the dispersion means is chosen from a distributor network with a homogeneous distribution of the points of injection of the gaseous fraction withdrawn in step f) over the entire cross section of the reactor.

Preferably, the velocity of the gaseous fraction withdrawn at the outlet of the orifices is between 1.0 and 30.0 m/s. Its superficial velocity (volumetric gas velocity divided by the cross section of the reaction chamber) is between 0.5 and 10.0 cm/s and preferably between 1.0 and 8.0 cm/s.

Preferably, the rate of withdrawal of the gaseous fraction is between 0.1 and 100% of the flow rate of gaseous ethylene introduced in step b), preferably 0.5 and 90.0%, preferably 1.0 and 80.0%, preferably between 2.0 and 70.0%, preferably between 4.0 and 60.0%, preferably between 5.0 and 50.0%, preferably between 10.0 and 40.0% and preferentially between 15.0 and 30.0%.

Advantageously, the rate of withdrawal of the gaseous fraction in step f) is dependent on the pressure within the reaction chamber, so making it possible to maintain the pressure at a desired value or in a desired range of values and so to compensate the phenomenon of breakthrough of gaseous ethylene into the headspace.

In one particular embodiment, the gaseous fraction withdrawn in step f) is divided into two streams: a first, principal gas stream, which is recycled directly into the reaction chamber, and a second gas stream.

In one preferred embodiment, said second gas stream corresponds to a purge of the gaseous headspace, allowing a part of the uncondensable gases to be removed.

Preferably, the flow rate of the second gas stream is between 0.005 and 1.00% of the flow rate of ethylene introduced in step b), preferably between 0.01 and 0.50%.

EXAMPLES

The examples below illustrate the invention without limiting the scope thereof.

Example 1: Comparative Example Corresponding to FIG. 1

Example 1 uses a gas/liquid oligomerization reactor according to the prior art, as described in FIG. 1, comprising a reaction chamber of cylindrical shape having a diameter of 2.63 m and a liquid height of 4.31 m.

Implementation of the Process for the Oligomerization of Ethylene According to the Prior Art, at a Pressure of 7.0 MPa and at a Temperature of 130° C., Comprising the Following Steps:
- the chromium-based catalytic system, as described in patent FR 3 019 064, is introduced into the liquid phase of the reaction chamber in the presence of cyclohexane as solvent, with a ratio of the input flow rate by mass of solvent to the input flow rate by mass of ethylene of
- said catalytic system is brought into contact with gaseous ethylene by introducing the gaseous ethylene into the lower part of said chamber,
- the reaction effluent is recovered.

The performance levels of this reactor make it possible to convert 79.6% of the injected gaseous ethylene and to achieve a selectivity of 78.8% for 1-hexene. This reactor makes it possible to obtain a dissolved ethylene saturation of 60.0%, measured by gas chromatography analysis of a sample of the liquid phase withdrawn from the reaction chamber.

Example 2: According to the Invention Corresponding to FIG. 2

A reactor according to the invention having two zones of decreasing diameter is used under the same conditions as Example 1.

The table below presents the results of saturation of ethylene in the liquid phase for four reactors having an identical total volume, but for which the dimensions (in metres) of the two zones according to the invention are different. The zone located at the bottom of the reaction chamber is denoted 1, the height, the diameter and the corresponding volume are respectively denoted H1, D1 and V1. The zone located at the top of the reaction chamber is denoted 2, the height, the diameter and the corresponding volume are respectively denoted H2, D2 and V2.

The degree of saturation is measured by gas chromatography analysis of a sample of the liquid phase withdrawn from the reaction chamber.

|  | Reactor 1 | Reactor 2 | Reactor 3 | Reactor 4 |
|---|---|---|---|---|
| Bottom zone height (H1) | 3.017 | 3.017 | 1.293 | 1.293 |
| Bottom zone diameter (D1) | 2.63 | 2.63 | 2.63 | 2.63 |
| Bottom zone volume (V1) | 16.39 | 16.39 | 7.02 | 7.02 |
| Top zone height (H2) | 2.02 | 5.17 | 4.71 | 12.07 |
| Top zone diameter (D2) | 2.02 | 1.315 | 2.104 | 1.315 |
| Top zone volume (V2) | 7.02 | 7.02 | 16.39 | 16.39 |
| Overall volume | 23.4 | 23.4 | 23.4 | 23.4 |
| Degree of saturation (%) | 77 | 95 | 84 | 97 |
| Ethylene conversion (%) | 73.9 | 67.5 | 71.5 | 66.9 |
| 1-Hexene selectivity (%) | 83.4 | 86.9 | 84.9 | 87.2 |

The results presented are obtained for a mass ratio of the flow rate of injected solvent to the flow rate of injected gaseous ethylene equal to 1.

These results clearly illustrate the gain in performance levels provided by the use of a reactor according to the invention. Thus, a reactor according to the present invention makes it possible to obtain better ethylene saturation of the liquid phase, and therefore better selectivity for targeted product, in this case 1-hexene, for one and the same total volume of the reactor, and for an identical residence time.

The invention claimed is:

1. A gas/liquid oligomerization reactor comprising:
a reaction chamber (1), of elongate shape along a vertical axis,
a means for introducing gaseous ethylene (2), located in a bottom of the reaction chamber,
a means for withdrawing (5) a reaction liquid effluent, located in the bottom of the reaction chamber, and
a means for purging (4) a gaseous fraction, located at the atop of said reactor; wherein
said chamber is composed of n consecutive zones having a diameter Dn which decreases in the direction from a bottom zone to a top zone of said chamber,
the ratio (Dn/Dn−1) of the diameter of an upper zone Dn, to the diameter of an adjacent lower zone Dn−1, is less than or equal to 0.9,
for a given zone, the ratio of the volume Vn, to the total volume of the reaction chamber, Vtot, (Vn/Vtot) is between 0.2 and 0.8,
the n consecutive zones are placed in series along a vertical axis of the reaction chamber reactor so as to define zones in the reaction chamber having diameters that decrease from a bottom of the reaction chamber to a top of the reaction chamber and thus to increase the height of a liquid phase that can be contained in said reaction chamber compared to a height of a constant-diameter reactor.

2. The reactor according to claim 1, wherein the number n of zones is between 2 and 5.

3. The reactor according to claim 1, wherein the ratio (Dn/Dn−1) of the diameter of an upper zone n to the diameter of an adjacent lower zone n−1 is between 0.1 and 0.9.

4. The reactor according to claim 1, wherein the ratio (Hn/Hn−1) of a height of an upper zone n, denoted Hn, to a height of an adjacent lower zone n−1, denoted Hn−1, is between 0.2 and 3.0, preferably between 0.3 and 2.5.

5. The reactor according to claim 1, wherein the ratio (Vn/Vtot) of the volume of a zone n of the reaction chamber, denoted Vn, to the total volume of the reaction chamber, denoted Vtot, corresponding to the volume of the sum of the n zones is between 0.25 and 0.75.

6. The reactor according to claim 1, wherein the n zones making up said reaction chamber are formed of cylinders of decreasing diameter.

7. The reactor according to claim 1, wherein the n zones making up said reaction chamber are formed by internals positioned inside the reaction chamber so as to reduce the reaction chamber its-diameter over a given zone.

8. The reactor according to claim 1, further comprising a recirculation loop comprising a withdrawal means on a lower part of the reaction chamber to withdraw a liquid fraction and to deliver the liquid fraction to one or more heat exchanger(s) capable of cooling the liquid fraction, and a means for introducing said cooled liquid fraction into an upper part of the reaction chamber.

9. The reactor according to claim 1, further comprising a means for withdrawing a gaseous fraction at a level of a gaseous headspace of the reaction chamber and a means for introducing the withdrawn gaseous fraction into a liquid phase in a lower part of the reaction chamber.

10. An oligomerization process using the reactor as claimed in claim 1, comprising:
    conducting an oligomerization process in the reactor at a pressure between 0.1 and 10.0 MPa, at a temperature between 30° C. and 200° C., and wherein the process comprises the following steps:
    a step a) of introducing a catalytic oligomerization system comprising a metal catalyst and an activating agent into the reaction chamber,
    a step b) of bringing the catalytic system into contact with gaseous ethylene by introducing gaseous ethylene into a lower zone of the reaction chamber,
    a step c) of withdrawing a liquid fraction,
    a step d) of cooling the liquid fraction withdrawn in step c) by passing the liquid fraction through a heat exchanger,
    a step e) of introducing the liquid fraction cooled in step d) into an upper part of the lower zone of the reaction chamber.

11. The process according to claim 10, further comprising recycling a gaseous fraction, withdrawn from an upper zone of the reaction chamber and introducing the gaseous fraction into a liquid phase in a lower part of the reaction chamber.

12. The reactor according to claim 1, wherein the ratio (Hn/Hn−1) of a height of an upper zone n, denoted Hn, to a height of an adjacent lower zone n−1, denoted Hn−1, is between 0.3 and 2.5.

13. The reactor according to claim 1, further comprising a recirculation loop comprising a withdrawal means at the bottom of the reaction chamber to withdraw a liquid fraction and to deliver the liquid fraction to one or more heat exchanger(s) capable of cooling the liquid fraction, and a means for introducing cooled liquid fraction into an upper part of the reaction chamber.

14. The reactor according to claim 1, wherein the number n of zones is between 2 and 4.

15. The reactor according to claim 1, wherein the ratio (Dn/Dn−1) of the diameter of an upper zone n to the diameter of an adjacent lower zone n−1 is between 0.15 and 0.85.

16. The reactor according to claim 1, wherein the ratio (Dn/Dn−1) of the diameter of an upper zone n to the diameter of an adjacent lower zone n−1 is between 0.3 and 0.7.

17. The reactor according to claim 1, wherein the ratio (Hn/Hn−1) of a height of an upper zone n, denoted Hn, to a height of an adjacent lower zone n−1, denoted Hn−1, is between 0.4 and 2.0.

18. The reactor according to claim 1, wherein the ratio (Hn/Hn−1) of a height of an upper zone n, denoted Hn, to a height of an adjacent lower zone n−1, denoted Hn−1, is between 0.6 and 1.0.

19. The reactor according to claim 1, wherein the ratio (Vn/Vtot) of the volume of a zone n of the reaction chamber, denoted Vn, to the total volume of the reaction chamber, denoted Vtot, corresponding to the volume of the sum of the n zones is between 0.3 and 0.7.

20. The reactor according to claim 1, wherein the ratio, Htot/D1, of the total height of the chamber, Htot, to the diameter of the bottom zone of said chamber, D1, is between 1 and 17.

* * * * *